United States Patent [19]

Augustin

[11] Patent Number: 4,461,169

[45] Date of Patent: Jul. 24, 1984

[54] METHOD AND APPARATUS FOR MEASURING THE QUANTITIES OF FUEL INJECTED BY INJECTION PUMPS FOR INTERNAL COMBUSTION ENGINES

[75] Inventor: Ulrich Augustin, Kernen, Fed. Rep. of Germany

[73] Assignee: Daimler-Benz Aktiengesellschaft, Fed. Rep. of Germany

[21] Appl. No.: 429,677

[22] Filed: Sep. 30, 1982

[30] Foreign Application Priority Data

Oct. 7, 1981 [DE]  Fed. Rep. of Germany ....... 3139831

[51] Int. Cl.³ ............................................ G01M 15/00
[52] U.S. Cl. ................................................ 73/119 A
[58] Field of Search ...................... 73/119 A, 168, 239, 73/232; 310/338; 328/132

[56] References Cited

U.S. PATENT DOCUMENTS 4,171,638 10/1979 Coman et al. .......................... 73/168
4,362,052 12/1982 Heath et al. ....................... 73/119 A

OTHER PUBLICATIONS

Thomas, Frank K., *The Fuel Delivery Indicator (FDI), a Useful Device for the Development of Diesel Engines*, ASME Publication, NY, 1975, pp. 1 to 7, No. 74-DG-P-5.

*Primary Examiner*—S. Clement Swisher
*Assistant Examiner*—Ellwood G. Harding, Jr.
*Attorney, Agent, or Firm*—Craig & Burns

[57] ABSTRACT

A method and apparatus is disclosed which enables quantities of fuel, successively injected from different injection nozzles into a measuring chamber which is bounded by a measuring piston, to be measured, even individually, without emptying this chamber between two successive injections by actuating a drain valve.

For this purpose, a unidirectional and stepwise displacement of the measuring piston—starting, in each case, from its final position following its last yielding movement—is detected by a precision position transmitter and is evaluated by an electronic recording instrument.

Measurements can be made quickly with respect to all the pump elements making up an injection pump, individually and successively, using only one measuring arrangement.

26 Claims, 2 Drawing Figures

METHOD AND APPARATUS FOR MEASURING THE QUANTITIES OF FUEL INJECTED BY INJECTION PUMPS FOR INTERNAL COMBUSTION ENGINES

The invention relates to a method and apparatus for measuring quantities of fuel, successively ejected through injection nozzles, which are connected to a measuring apparatus, into a measuring chamber possessing a measuring piston to which gas pressure is applied, which yields against this gas pressure, whenever a quantity of fuel is ejected, and the yielding movement of which, on each occasion, generates signals in a transmitter, which are a measure of the quantity of fuel ejected.

The measurement of the quantity of fuel injected per stroke by means of a measuring instrument is known, this instrument being the so-called "quantity indicator" (Paper by Frank Thoma "der Einspritzmengen-Indikator, ein nützliches Meßgerät für die Entwicklung von Diesel-motoren [The Injection-Quantity Indicator, a useful measuring instrument for the development of Diesel Engines]", presented at the 1974 Annual Conference of the American Society of Mechanical Engineers, in Houston, U.S.A.). However, quantity indicators of this type possess the disadvantage that measurements can be made only at one injection nozzle. Although in order to reduce the expenditure of time, and to reduce the cost, proposals have been made with regard to connecting a plurality of injection nozzles to one quantity indicator, it is possible to connect, at most, only three nozzles, since a third of a revolution of the injection pump is needed for one measuring operation, namely the injection of the quantity of fuel into a measuring chamber, the yielding of the measuring piston and, finally, the opening of the drain valve.

Each individual injection is consequently introduced, as a unique filling quantity, into a measuring chamber. The piston travels over a distance which is directly proportional to the volume of liquid injected. The volume measurement is transformed into a position measurement. In this case, the measuring chamber is emptied between two successive injections, this being effected by means of the controllable drain valve in the measuring chamber.

Compared to the known techniques, the method and apparatus of the present invention carry out the measuring operations for the checking-out of injection pumps with a plurality of pump-elements in a quicker and more precise manner, it being possible to measure the filling quantities delivered into the measuring chamber by each pump-element separately and independently of the number of pump-elements.

This is achieved, according to the invention, when, as the quantities of fuel are successively injected, the measuring piston executes unidirectional and immediately successive yielding movements, the starting position of the piston, when executing a yielding movement, being, in each case, the same as its final position during the previous yielding movement, and each final position of the piston being detected by the transmitter.

As a result of the unidirectional, stepped yielding movements of the measuring piston, which is subjected to pressure from all the injection nozzles during a complete stroke, it is possible to achieve a higher measurement accuracy when comparing the nozzles one with another. Moreover, only one measuring instrument is required for four or more nozzles, since the quantities ejected from all the nozzles can be measured in the course of a single piston stroke.

In order to detect, in the course of a piston stroke, each yielding movement of the measuring piston, it is proposed that the transmitter which records the yielding movement of the measuring piston be formed by an incremental position transmitter.

The incremental position transmitters and/or digital high-precision length-measuring instruments, which are known per se, enable individual quantities, total quantities, and the cam offset to be measured simultaneously.

In a preferred embodiment of the invention, the measuring pin of the position transmitter is arranged to be located coaxially with the measuring piston.

In order to have, for each individual injection from the nozzles which are connected to the measuring apparatus, conditions which are as nearly identical as possible, it is further proposed that the measuring piston and an electromagnetically controllable drain valve, which is located opposite to this piston, are interconnected by a central bore, into which inlet bores open, these bores departing from the injection nozzles and being arranged in a star shape, the radial spacing of the injection nozzles being, in each case, uniform with respect to the central bore. This arrangement results in identical lengths, and hence identical shaft movement-times.

It is impossible to exclude the possibility, when using the measuring apparatus, of disturbances during the measuring operations, caused by bubbles which have been conveyed into the measuring chamber. In order to prevent such disturbances, it is arranged for the measuring piston to be located beneath the central bore, and for the drain valve to be located above it, thus ensuring that the bubbles flow away through the top-mounted drain valve.

An advantageous further development of the invention results when a control element, which functions in a temperature-dependent manner, is installed upstream of the point of entry into the measuring chamber. When the temperature fluctuations occur, this arrangement of the temperature measuring point results in a simple injection-quantity correction.

A useful embodiment of the invention also results when the measuring piston possesses a sealing ring at the bottom end of the piston skirt. This measure results in the running-surfaces of the piston remaining more effectively lubricated, and the gas space and the measuring chamber being more reliably separated.

It is accordingly, an object of the invention to carry out the measuring operations for checking-out injection pumps which is quicker and more precise than methods presently known in the art.

It is an object of the invention to perform measuring operations for injection pumps wherein filling quantities delivered to a measuring chamber by each pump-element is effected separately and independently of the number of pump-elements.

It is another object of the invention to carrying out measuring operations for injection pumps by successive incremental movements of a measuring piston actuated in response to successive inputs of fuel to a measuring chamber.

It is a further object of the invention to carry out measuring operations with respect to injection pumps which is more accurate in the measurement of the quantity of fuel measured than has been previously known.

It is another object of the invention to provide method and apparatus wherein a piston moves within a cylinder in response to the injection of fluid from plural sources, the movement of the piston indicating the volume of fluid injected from the respective sources.

It is another object of the invention to provide method and apparatus whereby plural injection nozzle means, each receiving respectively inputs from the plural sources generate respective incremental indications of the amount of fluid injected.

It is an additional object of the invention to successively indicate the amount of fluid injected successively from fluid sources which are fuel sources.

It is another object of the invention wherein a means for indicating successively indicates each injection of fluid from a fluid source into a measuring chamber.

It is another object of the invention to provide an indication of fluid injected into a measuring chamber wherein a measuring pin means is disposed coaxially with the movement of a piston means within the chamber.

It is another object of the invention to indicate the magnitude of fluid injected into a measuring chamber wherein the measuring chamber receives fluid from a bore means, the latter receiving plural inputs from inlet bores in response to input from injection nozzles.

It is a still further object of the invention to provide for a method and apparatus wherein indication is presented of the quantity of fuel into a measured chamber, a means for draining the measuring chamber actuated by an electromagnetic means.

It is another object of the invention to provide fuel injected through a central bore from injection nozzles, disposed between the central bore and a measuring chamber which operates in a temperature dependent manner.

It is another object of the invention to provide a sealing means in the form of O-ring disposed in the skirt of a piston within a measuring chamber.

These and other objects, features and advantages of the present invention will become more apparent from the following description when taken in connection with the accompanying drawing which shows, for purposes of illustration only, one embodiment in accordance with the present invention.

Figure 1:
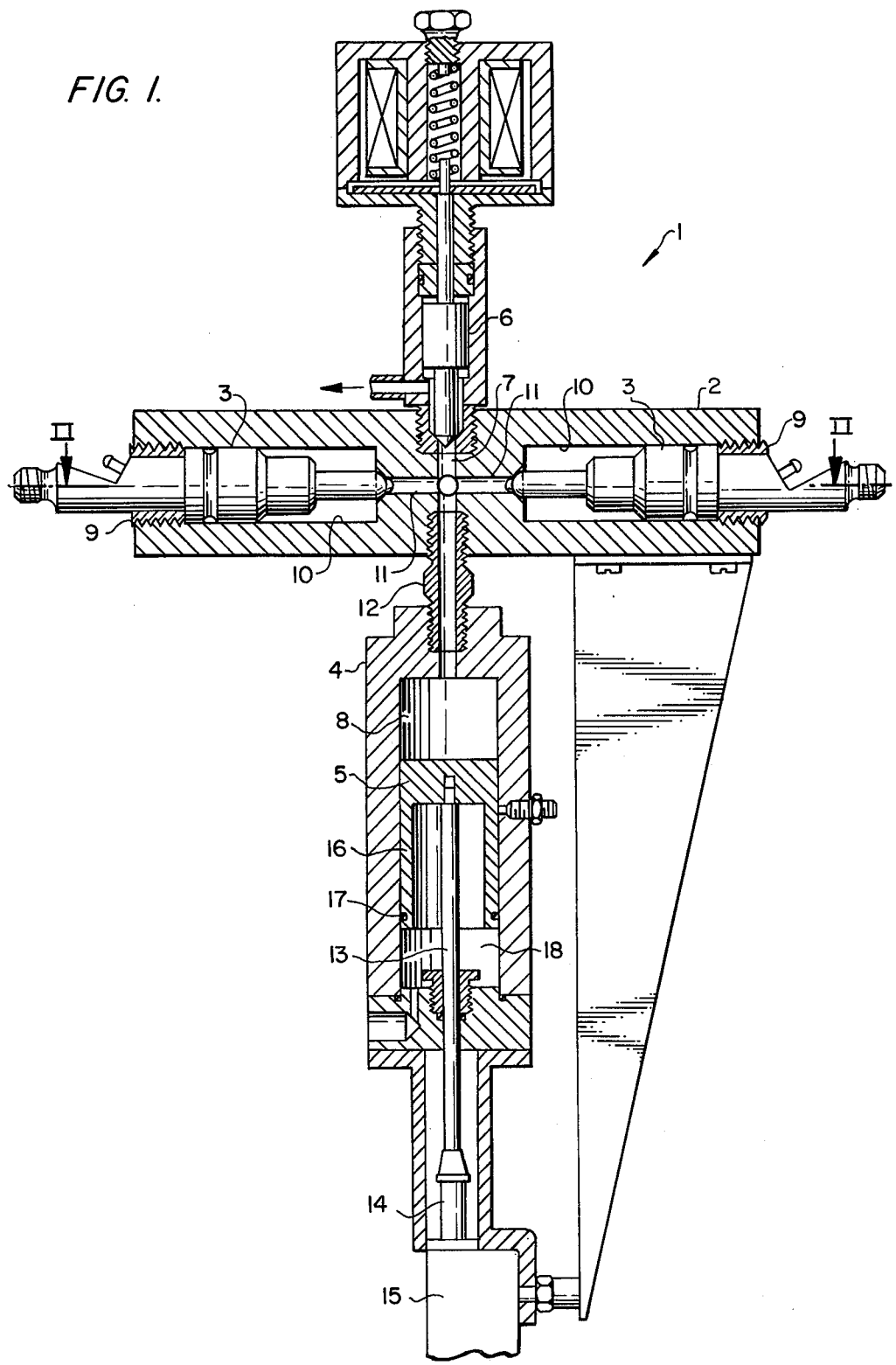
FIG. 1 is a cross-sectional side view showing the measuring apparatus and discharge value disposed in relation to the inlet bores.
Figure 2:
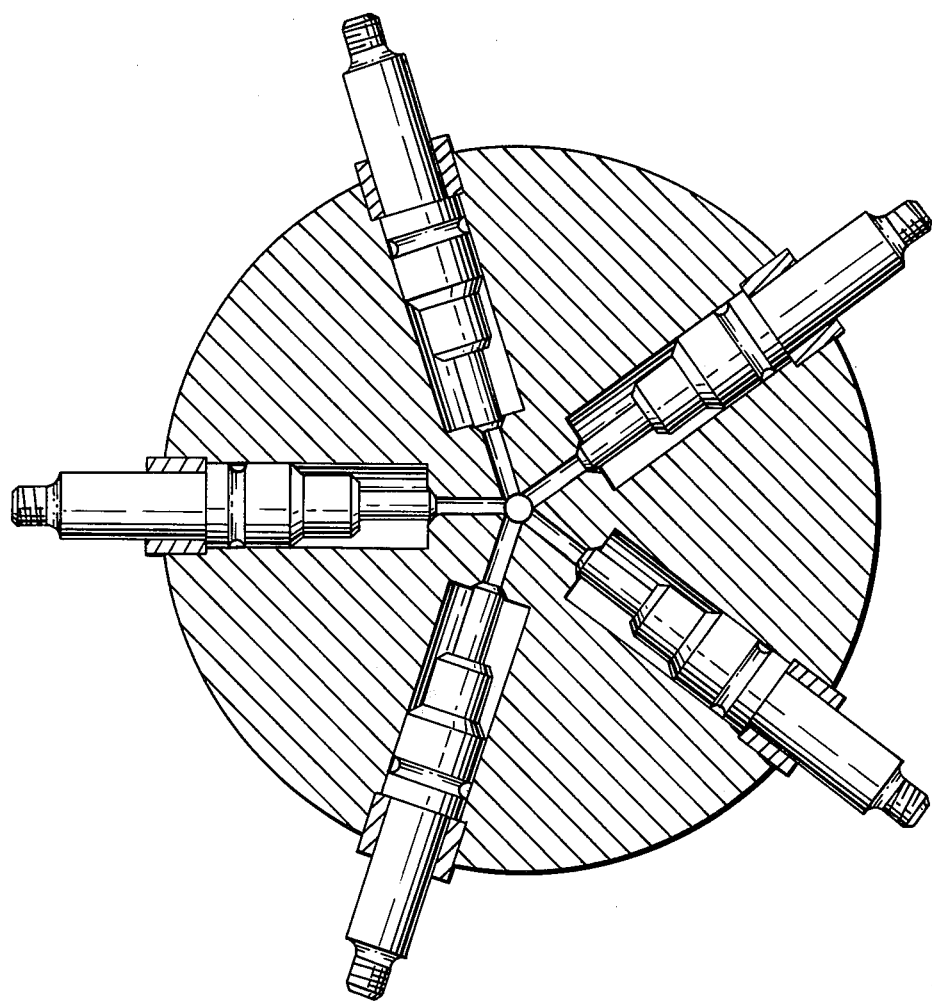
FIG. 2 is a cross sectional top view showing the inlet bores arranged in a star configuration.

As shown in FIG. 1, the measuring apparatus 1, or quantity indicator, for the volumetric measurement of quantities of fuel which are injected in injection-systems for diesel engines comprises a circular plate-shaped receiving body 2, for e.g. four injection nozzles 3 of the injection-system, a measuring cylinder 4, located beneath, with a measuring piston 5, and an electromagnetically controlled drain valve 6, which is located above the receiving body 2.

A central bore 7 in the receiving body 2 connects the drain valve 6 to a measuring chamber 8, which is bounded by the measuring piston 5. At every injection nozzle 3, which are all secured by means of nozzle-holders 9 in receiving bores 10 in the receiving body 2, mutually adjoining inlet bores 11 of equal length and arranged in a star shape open into the central bore 7. A control element 12 of conventional construction which functions in a known temperature-dependent manner, is located between the receiving body 2 and the measuring cylinder 4, the injected quantities of fuel passing into the measuring chamber 8 via this control element which serves to correct the quantities injected when temperature variations occur.

The measuring piston 5 is connected, by means of its piston rod 13, to the measuring pin 14 of an incremental position transmitter 15. The piston rod 13 and measuring pin 14 are located coaxially.

As is well-known, the incremental position transmitter 15, a precision measuring instrument, possesses a precision scale, made of glass, with ruled grating divisions (grating constant, for example 10 $\mu$m, that is to say, a 5- $\mu$m ruled line, and a 5- $\mu$m space), and is rigidly attached to the measuring pin 14. The glass scale is scanned in a contact-free manner, by means of opposing gratings formed by sensing line-arrays, and photoelectric cells.

The measuring piston 5 possesses, on its lower piston skirt 16, a sealing ring 17, which is designed in the form of a so-called O-ring and is intended to prevent the nitrogen from passing from a gas space 18 into the measuring chamber 8. As a result of the special position of the ring 17, the running surfaces of the piston still remain lubricated.

The following steps occur in connection with carrying out the measurement:

The measuring piston 5 is situated in the upstream position. The electromagnetically controlled drain valve 6 is closed, and the measuring system is filled with fuel. Following a defined number of preliminary cycles, which are used to determine the number of nozzles, and to measure the quantity of fuel expected for the load-range in question, the actual measurement is commenced. In this process, the quantity of fuel, metered in by the injection pump, passes—as previously in the case of the preliminary cycles—to the injection nozzles 3, which are secured to the measuring apparatus 1, via pressure-lines corresponding to the number of pump-elements, and thence, in accordance with the injection sequence, into the measuring chamber 8. For every quantity of fuel ejected from the injection nozzles, the measuring piston yields, against the nitrogen pressure in the gas space 18, in a stepwise manner and, in particular, starting from the final position during the last yielding movement. The measuring chamber 8 is not, therefore, emptied between two successive injections and, on the contrary, the electromagnetically controlled drain valve is not operated until a point in time at which, for example, all the injection nozzles have ejected fuel. Throughout this process, each yielding movement of the measuring piston 5 is measured, to a high accuracy, each of these movements being associated with a particular pump-element, and the signals which, as the measuring pin is displaced, are generated in the photoelectric cells are evaluated. The electronic recording instruments are not discussed in more detail here.

The measuring apparatus enables measurements and adjustments to be carried out on injection pumps with 4, 5 or more pump elements, and with a modest expenditure of time. It is possible to report on the delivery-rate, on the fluctuations in delivery-rate, that is, change in the total quantity delivered in the course of time, on the control of the plungers wherein varying quantities are injected by the different pump-elements of an injection pump, and on the fluctuation of the quantities injected wherein this fluctuation relates to an individual element, in comparison with the fluctuations in the total quantity delivered.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A method for measuring quantities of fuel, the steps comprising successively injecting through injection nozzles, which are connected to a measuring apparatus, fuel into a measuring chamber possessing a measuring piston, applying to the piston an opposing gas pressure, advancing said piston unidirectionally in a direction opposed to said gas pressure to expand the chamber in response to the quantities of fuel successively injected, the starting position of the piston, when executing an advancing movement, being, in each case, the same as its final position during the previous advancing movement, and detecting each final position of the piston.

2. Apparatus for measuring quantities of a fluid comprising a cylinder, a piston means disposed within the cylinder to define a measuring chamber and a closed gas-filled space, means injecting from plural sources a fluid into said measuring chamber for moving the piston means to successive discrete positions as fluid is received from said plural sources to compress the gas in the gas-filled space, and means for indicating the volume of fluid injected in accordance with the magnitude of the movement of the piston means to said positions.

3. Apparatus in accordance with claim 2, wherein the means for injecting comprises plural injection nozzle means each receiving respectively an input from one of said plural sources for generating input to the measuring chamber.

4. Apparatus in accordance with claim 3, wherein said sources are fuel sources and the means for indicating comprises means responsive to the movement of the piston means for indicating successive inputs of fuel from said fuel sources.

5. Apparatus in accordance with claim 3, wherein the means for indicating comprises means responsive to the movement of the piston means for indicating at least two successive inputs of fuel from different sources.

6. Apparatus in accordance with claim 3, wherein the means for indicating comprises means for indicating the incremental position of the piston means in response to each injection of fluid.

7. Apparatus in accordance with claim 2, wherein the means for indicating comprises a measuring pin means disposed for movement coaxial with the movement of the piston means for indicating volume of fluid injection.

8. Apparatus in accordance with claim 3, further comprising a bore means for deliverying the input to the measuring chamber, and plural inlet bores disposed in star configuration each connected respectively to a corresponding source, the volume of fluid held by each inlet bore from nozzle to the bore means being substantially identical.

9. Apparatus in accordance with claim 2, further comprising means for draining the measuring chamber, and means for actuating the means for draining.

10. Apparatus in accordance with claim 2, further comprising a bore means for deliverying the input to the measuring chamber, means for draining the measuring chamber disposed in the input to said bore means.

11. Apparatus in accordance with claim 2, further comprising means disposed at the input of the measuring chamber for correcting the indicated quantity for temperature variation of the input fluid.

12. Apparatus in accordance with claim 2, further comprising ring means disposed on the piston means for sealing the piston means within the cylinder.

13. Apparatus for measuring quantities of a fluid in accordance with claim 2, wherein said means for moving the piston means further comprises means for effecting uniform piston movement magnitudes and times for injection from the plural sources by way of plural inlet bores disposed in star configuration, the volume of fluid held by each inlet bore from nozzle to measuring chamber being substantially identical.

14. Apparatus in accordance with claim 2, wherein the piston means is positioned below the means for injecting and further comprising means positioned above the means for injecting for draining off bubbles from at least one of the means for injecting and the measuring chamber.

15. A method for measuring quantities of a fluid comprising the steps of establishing a gas filled space, establishing a confined space for receiving fluid, expanding said confined space to discrete plural volumes successively larger in size in response to the respective corresponding injection of fluid from plural sources into said confined space to concomitantly reduce the gas filled space, and indicating the magnitude of the expansion as a function of the amount of fluid injected.

16. A method for measuring in accordance with claim 15, wherein the step of expanding by injection of fluid further comprises injecting fluid from the plural sources by way of a single input to the confined space.

17. A method for measuring in accordance with claim 16, wherein the sources are fuel sources and the indicating step further comprises indicating successive inputs of fuel from said sources.

18. A method for measuring in accordance with claim 16, wherein the step of indicating comprises indicating the incremental expansion of the confined space in response to each injection of fluid.

19. A method for measuring in accordance with claim 15, wherein the step of indicating further comprises indicating the volume of fluid injected in a direction coaxial with the direction of expansion of the confined space.

20. A method for measuring in accordance with claim 16, further comprising
directing injected fluid radially toward a bore means, and delivering the injected fuel from the bore means to the confined space.

21. A method for measuring in accordance with claim 15, further comprising the step of draining the confined space, and
implementing the said step of draining.

22. A method for measuring in accordance with claim 15, further comprising the step of delivering an input from a bore means to the confined space and
draining the confined space by way of the bore means.

23. A method for measuring in accordance with claim 15, comprising the further step of
correcting the indication for temperature variation of the input fluid.

24. A method for measuring in accordance with claim 15, further comprising the step of
sealing the confined space from the gas-filled space.

25. A method for measuring in accordance with claim 15, further comprising the steps of
establishing substantially equal volume bores from said plural sources to said confined space prior to the step of expanding in order to effect substantially equal successive expansions of said chamber as fluid is input from successive bores.

26. A method for measuring in accordance with claim 15, further comprising the step of
draining gas bubbles existing in at least one of the measuring chamber and means injecting from plural sources a fluid from above the measuring chamber and means injecting from plural sources a fluid.

* * * * *